No. 874,559.
PATENTED DEC. 24, 1907.
H. L. BEACH.
SYSTEM OF CONTROL.
APPLICATION FILED MAR. 3, 1906.
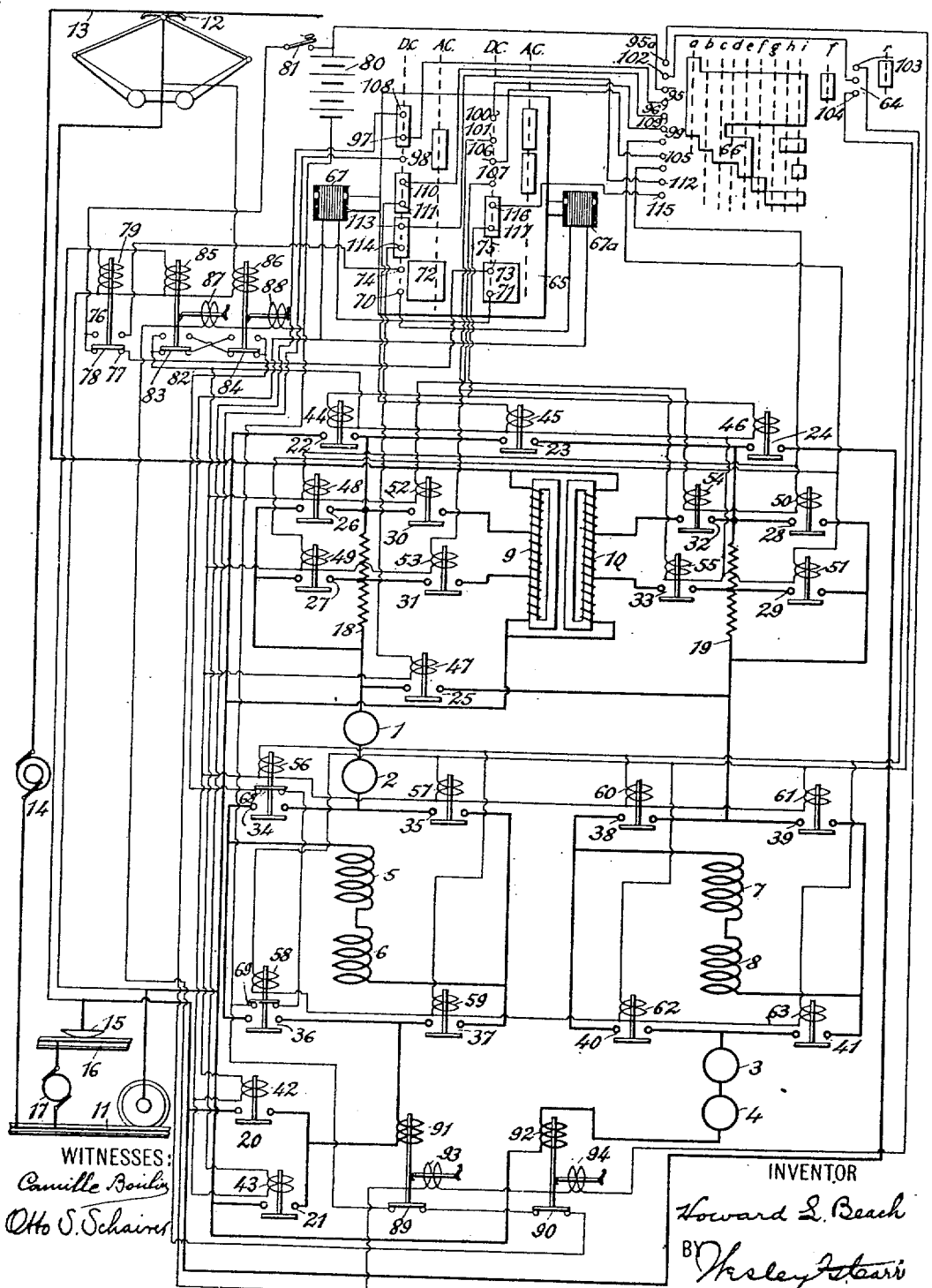
WITNESSES:
Camille Boulin
Otto S. Schairer
INVENTOR
Howard L. Beach
BY Wesley Stearn
ATTORNEY

UNITED STATES PATENT OFFICE.

HOWARD L. BEACH, OF WILKINSBURG, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

No. 874,559.   Specification of Letters Patent.   Patented Dec. 24, 1907.

Application filed March 3, 1906. Serial No. 304,097.

*To all whom it may concern:*

Be it known that I, HOWARD L. BEACH, a citizen of the United States, and a resident of Wilkinsburg, in the county of Allegheny and State of Pennsylvania, have invented a new and useful Improvement in Systems of Control, of which the following is a specification.

My invention relates to systems of control for electrical translating devices and particularly to systems for the control of motors that are adapted to be operated by either direct or alternating current.

One object of my invention is to provide a novel and improved means whereby the circuits of the system may be arranged automatically in accordance with the character of energy that is supplied thereto.

Another object of my invention is to insure opening of the motor circuit except when the system is supplied with the one or the other character of energy.

A further object of my invention is to provide means whereby the devices for arranging the circuits of the system in accordance with the character of energy that is supplied thereto may be rendered inoperative when the motor circuits are established for either forward or reverse operation.

The single figure of the accompanying drawing illustrates, diagrammatically, a system embodying my invention.

Alternating current may be supplied to electric motors, having armatures 1, 2, 3 and 4 that are arranged in series-connected pairs, and having field magnet windings 5, 6, 7 and 8 that are similarly arranged, from transformers 9 and 10 whereby the voltages applied thereto may be varied, the transformers being arranged in parallel circuit between a grounded track rail 11 and a trolley collector 12 that is adapted to engage a distributing conductor 13 and is especially constructed for the collection of high-voltage currents. The track rail 11 and the distributing or trolley conductor 13 may be supplied with alternating current from any suitable source such as that shown at 14.

The system may be supplied with direct current from a current collector or shoe 15 that engages a third rail 16 to which and to the track rail 11 a suitable source of direct current, such as that shown at 17, may be connected, resistances 18 and 19 being included in the motor circuits under certain conditions of operation. The circuits of the motors may be established, and the circuit relations thereof governed, by means of switches 20, 21, 22, 23, 24 and 25, and the amounts of the resistances 18 and 19 that are included in the circuits may be governed by means of switches 26, 27, 28 and 29. The voltages applied to the motors from the transformers 9 and 10, when operating by alternating current, may be governed by means of switches 30, 31, 32 and 33. The direction of rotation of the first pair of motors may be changed by changing the direction of current flow through the field magnet windings 5 and 6 by means of switches 34, 35, 36 and 37, and switches 38, 39, 40 and 41 perform the same functions with reference to the other pair of motors.

The switches 20 to 41, inclusive, may be provided, respectively, with magnet windings 42 to 63, inclusive, for operating the switches directly, or other means, such as electro-pneumatic devices, for operating the switches may be employed. The circuits of magnet windings 56 to 63, inclusive, are governed by means of a direction-controlling or master reversing switch 64 and the circuits of the remaining magnet windings are governed by means of a change-over switch 65 and a master switch 66.

The change-over switch 65 is adapted to occupy positions indicated by broken lines A—C and D—C and thereby serves to arrange the circuits of the controlling magnet windings for the individually operated switches so that the motors may be connected in series-parallel relation between suitable points in the transformer windings, 9 and 10 and the track rail 11, when operating by alternating current, and so that the motors may be connected all in series for low speeds and in series-parallel relation for high speeds, between the third rail 16 and the track rail 11, when operating by direct current.

The change-over switch 65 is adapted to be operated, or controlled in its operation, by means of electro-magnets 67 and 67ᵃ, it being understood that the magnets may serve to operate the change-over switch directly or to control other means, such as electro-pneumatic devices, for operating the switch. Interlocking switches 68 and 69, that are operated, respectively, by reversing switches 34 and 36, serve to prevent energizing of the magnet windings 67 and 67ª when the switches are closed, the one or the other of the switches being closed according as the motors operate in the forward or in the reverse direction. Terminals of each of the magnet windings 67 and 67ª are connected, respectively, to contact fingers 70 and 71 of interlocking switches 72 and 73 that are carried by the change-over switch 65 and that serve to interrupt the circuits of the magnet windings 67 and 67ª after the change-over switch has been operated to the one position or the other. The remaining contact terminals 74 and 75 of the interlocking switches are connected, respectively, to upper and lower contact terminals 76 and 77 of a relay switch 78, controlling magnet winding 79 of which is connected between the current collector 15 and the track rail 11. The relay switch 78 normally occupies the position shown and thus permits of the establishing of a circuit from a battery 80 through the magnet winding 67, by means of a manually-operated switch 81, the magnet winding 67 serving to cause the change-over switch to be moved to the position indicated by the broken lines A—C, that is, so as to arrange the circuits of the system for operation of the motors by alternating current. It will thus be understood that the switch 78 prevents moving of the change-over switch 65 for the purpose of arranging the circuits of the system for operation by direct current when alternating current is supplied to the system, and vice versa, its function being to insure arrangement of the circuits by the change-over switch of the system in accordance with the character of energy that is supplied thereto. If the change-over switch 65 is operated pneumatically and the magnet windings 67 and 67ª serve to control the pneumatic operating devices, the switch 81 may be employed to govern the supply of fluid-pressure to the operating devices for the change-over switch so that, unless fluid-pressure is supplied to the devices, operation of the change-over switch is impossible, such an arrangement being set forth in another application, Serial No. 304,096 filed by me of even date herewith.

One terminal of each of the magnet windings 42 to 63, inclusive, is connected to a conductor 82 that leads to one terminal of the battery 80 and in circuit with which are interposed relay switches 83 and 84, the controlling magnet winding 85 for the former of which is connected between the current collector 15 and the track rail 11, and the controlling magnet winding 86 for the latter of which is connected between the trolley 12 and the track rail 11. The circuits through the switches 83 and 84 are so arranged that when both switches occupy their lowermost positions, as shown, or when both occupy their uppermost positions, as may be caused when the trolley 12 engages the trolley conductor 13 and the shoe 15 engages the third-rail 16, the circuits of the magnets 42 to 63, inclusive, will be interrupted. A circuit can be established only when one of the current collectors 12 and 15 engages the corresponding distributing conductor; that is, when the switches 83 and 84 occupy non-corresponding positions.

The switches 83 and 84 are provided for the purpose of interrupting the circuits of the magnet windings 42 to 63, inclusive, and thereby causing the motor circuits to be interrupted when the current collector which is in use becomes disengaged from the corresponding distributing conductor, as may occur accidentally or in the third-rail at crossings. In order to prevent reëstablishing of the motor circuits in their original condition, except by reëstablishing starting conditions, movement of the switches 83 and 84 to their uppermost positions is prevented until the master switch 66 is returned to its initial position, by means of detents that are adapted to be released by means of magnet windings 87 and 88, the circuits of which are established only when the master switch 66 occupies its initial position.

Switches 89 and 90, that are adapted to be opened when the current traversing the respective pairs of motors and the controlling magnet windings 91 and 92 therefor exceeds a predetermined amount, are also interposed in the circuit of the common terminal conductor 82 for the magnet windings 42 to 63, inclusive, so that when an overload occurs upon either or both pairs of motors, the switches 20 and 41, inclusive, will open.

The specific means which I have shown and just described for preventing reëstablishing of the motor circuits except by reëstablishing starting conditions when the circuits of the windings 42 to 63, inclusive, are interrupted by one or more of the switches 83, 84, 89 and 90, are intended to be illustrative only of suitable means for the purpose and such as may be conveniently applied to the comparatively simple system in connection with which I have found it convenient to illustrate and describe my invention. As here shown, acceleration of the motors may be effected manually by means of the master switch 66, but systems are well known in the art in which acceleration of the motors may be caused to occur automatically until predetermined conditions of operation are attained, in which systems the individually operated switches in the motor circuits are suitably interlocked and the circuits are so arranged that the switches must of necessity operate in a predetermined order that is peculiar to the system, and it will, of course, be readily understood that the present invention is equally applicable to such systems and in many cases is preferably employed in such relations. When so applied, the reëstablishing of the motor circuits will usually occur automatically without returning the master switch to its initial position, but since the application of the invention to such systems would unnecessarily complicate the circuits and cause confusion, I have deemed it most expedient to illustrate means which necessitate returning of the master controller to its initial position whenever the motor circuits are interrupted, as indicative, broadly, of means for preventing reëstablishing of the motor circuits after interruption except by reëstablishing starting conditions.

In order to explain the operation of the system, let it be supposed first that the change-over switch 65 occupies the position shown and that the trolley 12 engages the conductor 13. Upon closing the switch 81, a circuit is established between the battery terminals by way of the devices that are indicated by reference characters 78, 73, 67, 68 and 69, the switch 78 occupying its lowermost position. Energizing of the magnet winding 67 causes operation of the change-over switch to the position indicated by the line A—C when the interlocking switch 73 interrupts the circuit thereof. If the master switch 66 is then moved to the position indicated by the broken line a, a circuit will be established between the battery terminals by way of devices 95, 95ª, 94, 93, 87 and 88, release of the detents for the switches 83, 84, 89 and 90 being thereby effected. As the trolley 12 engages the conductor 13, the magnet winding 86 will be energized and the switch 84 will be moved to its uppermost position, whereupon two circuits are established between the battery terminals, one by way of the devices indicated by reference characters 95, 96, 97, 98, 43, 83, 84, 90 and 89, switch 83 being in its lowermost position and switch 84 being in its uppermost position. The other circuit that is established is by way of devices 95, 99, 100, 101, 53, 55, 83, 84, 90 and 89. Energizing of the magnet windings 42, 53 and 55 causes the switches 21, 31 and 33 to close.

In the ordinary operation of the system, the direction-controlling switch 64 will be moved to the one or the other of the positions indicated by the broken lines f and r, before operation of the master switch 65, so that, upon operation of the latter, the circuits of the magnet windings of certain of the reversing switches will be closed. If it be assumed that the switch 64 is moved to the position indicated by the broken line f, a circuit will be established from the battery, through the devices 95, 102, 103, 104, 60, 63, 56, 59, 83, 84, 90 and 89, and switches 34, 37, 38 and 41 will then close. If the switch 64 is moved to the position r, magnet windings 57, 58, 61 and 62 will be energized and switches 35, 36, 39 and 40 will be closed, the direction of the current flow through the field magnet windings of the motors being reversed. Upon operation of the one or the other of the switches 34 and 36, the corresponding interlocking switches 68 and 69 will be opened and the circuits of the magnet windings 67 and 67ª of the change-over switch will be interrupted so as to prevent operation of that switch while the motor circuits are established.

When the control or auxiliary circuits are established, as has been indicated, by moving the master switch 66 to the position a and the switch 64 to the position f, the pairs of motors will be connected between suitable low-voltage points in the respective transformer windings and the ground, the circuit through one pair of motors traversing switch 31, a portion of the resistance 18, motor armatures 1 and 2, switch 34, motor field magnet windings 5 and 6, switch 37, magnet winding 91 and switch 21; and the other motor circuit traversing switch 33, a portion of the resistance 19, switch 60, motor field magnet windings 7 and 8, switch 41, motor armatures 3 and 4 and overload relay magnet winding 92. Upon movement of the master switch to the position b, the magnet windings 49 and 51 will be energized and switches 27 and 29 will close, the portions of the resistances 18 and 19 that were included in the motor circuits being thereby shunted. Movement of the master switch to the position c establishes a circuit through devices 95, 105, 106, 107, 52 54, 83, 84, 90 and 89, and the switches 30 and 32 consequently close. Movement of the master switch to the position d interrupts the circuit through the magnet windings 53 and 55 and permits switches 31 and 33 to open. One of the motor circuits is then established from a higher voltage point in the transformer winding 9 than was previously utilized, by way of the switch 30, the other half of the resistance 18 and through the motors, as was before described, and the other motor circuit is established in a corresponding manner. Movement of the master switch to the position e establishes circuits of the magnet windings 48 and 50 and the switches 26 and 28 close, thereby shunting resistances 18 and 19. The motors are now supplied with full voltage for operation by alternating current and further movement of the master switch 66 is ineffective while the change-over switch occupies the position indicated by the broken lines A—C.

If it is desired to operate by direct current, the trolley 12 is disengaged from the conductor 13 and the contact shoe 15 is caused to engage the third-rail 16, whereupon the switch 78 is moved to its uppermost position. If the change-over switch 65 occupies the position indicated by broken lines A—C, a circuit may be established by the switch 81, through interlocking switch 72, magnet winding 67ª and interlocking switches 68 and 69. When the change-over switch is moved to the position shown in full lines, the circuit of the magnet winding 67ª is interrupted by the interlocking switch 72. When the master switch occupies position a, magnet winding 87 is energized and causes the corresponding detent to permit operation of the switch 83 to its uppermost position. Then if the switch 64 occupies the position f, the reversing switches 34, 37, 38 and 41 will be closed, as before described closing of the switch 34 causing opening of the interlocking switch 68 which thereby causes interruption of the circuits of the magnet windings 67 and 67ª so as to prevent operation of the change-over switch while the motor circuits are established. While the master switch occupies position a, two circuits are established, one by way of the devices 95, 96, 97, 108, 42, 83, 84, 90 and 89 and the other traversing devices 95, 109, 110, 111, 45, 83, 84, 90 and 89. Switches 20, 23, 34, 37, 38 and 41 are then closed, and the motor circuits are established by way of devices 15, 20, 91, 37, 6, 5, 34, 2, 1, 18, 23, 19, 60, 7, 8, 41, 3, 4 and 92, the motors thus being connected all in series with the resistances 18 and 19 in circuit. Movement of the master switch to the position b establishes the circuits of magnet windings 49 and 51 and the switches 27 and 29 close, thereby shunting portions of the resistances 18 and 19. Movement of the master switch to the positions c and d establishes no new circuits, but upon movement to the position e, magnet windings 48 and 50 become energized and the switches 26 and 28 short-circuit the resistances 18 and 19, leaving the motors connected in series without resistance in the circuit. When the master switch is moved to the position f, a circuit is established by way of devices 95, 112, 113, 114, 47, 83, 84, 90 and 89, the switch 25 being thereby closed. The circuit of the magnet winding 45 is also interrupted, whereupon the switch 23 opens, and the motors are still left connected in full series relation without resistance in circuit. Movement of the master switch to position g establishes a circuit by way of the devices 95, 115, 116, 117, 44, 46, 83, 84, 90 and 89, the switches 22 and 24 being thereby closed; the circuit of magnet winding 47 is interrupted and switch 25 opens, leaving the motors connected in series-parallel relation with the resistances 18 and 19 included in circuit. In the succeeding positions h and i of the master switch, the resistances 18 and 19 are removed from the circuit by means of switches 26, 27, 28 and 29, in a manner which has been heretofore described, leaving the motors arranged in full series-parallel relation without resistance in the circuit.

It will be understood, from the description and drawing, that the change-over switch 65 serves to establish or interrupt the circuits of the controlling magnet windings for the individually operated switches in the motor circuits in such a manner that only such switches may be operated as are required to properly establish the motor circuits in accordance with the character of the energy supplied to the system. As has been before stated, all or any of the devices which are here shown as electrically operated may be operated by any other suitable means, such as pneumatic devices, the operations of which are controlled by means of the respective magnet windings. The arrangements of the circuits and the structural details of the devices may obviously be varied within wide limits without altering the mode of operation of the invention or departing from its spirit and scope.

I claim as my invention:

1. In a system of control, the combination with sources of direct and alternating current, translating devices and means for arranging the circuits of the system for operation thereof by the one character of energy or the other, of a switch that permits operation of the said means to arrange the circuits of the system for direct current operation only when the system is supplied with direct current.

2. In a system of control, the combination with sources of direct and alternating current, and translating devices, of a change-over switch for arranging the circuits of the system for operation of the devices by the one character of energy or the other, and a switch that permits operation of the change-over switch to arrange the circuits for direct current operation only when the system is supplied with direct current.

3. In a system of control, the combination with distributing conductors that are supplied, respectively, with direct and alternating current, current collectors to engage the respective conductors, and translating devices, of means for arranging the circuits of the system for operation of the devices by the one character of energy or the other and a switch that prevents the said means from operating to arrange the circuits for direct current operation except when the collector for direct current engages the corresponding conductor.

4. In a system of control, the combination with sources of direct and alternating current, and translating devices, of a change-over switch for arranging the circuits of the system for operation of the devices by the one character of energy or the other, controlling magnet windings therefor, and a circuit-governing switch that prevents the change-over switch from operating to arrange the circuits for operation by direct current except when direct current is supplied to the system.

5. In a system of control, the combination with distributing conductors that are supplied, respectively, with direct and alternating current, current collectors to engage the respective conductors, and translating devices, of a change-over switch for arranging the circuits of the system for operation of the devices by the one character of energy or the other, and a switch that prevents the change-over switch from operating to arrange the circuits for direct current operation except when the collector for direct current engages the corresponding distributing conductor.

6. In a system of control, the combination with distributing conductors that are supplied, respectively, with direct and alternating current, current collectors to engage the respective conductors, and translating devices, of a change-over switch for arranging the circuits of the system for operation of the devices by the one character of energy or the other, controlling magnet windings therefor, and a circuit-governing switch that prevents energizing of one of the magnet windings except when the collector for direct current engages the corresponding conductor.

7. In a system of control, the combination with motors that may be operated by either direct or alternating current, and a change-over switch for arranging the circuits of the system for operation thereof by the one character of energy or the other, of switches for governing the direction of rotation of the motors and means for preventing operation of the change-over switch except when the said direction-governing switches are open.

8. In a system of control, the combination with motors that may be operated by either alternating or direct current, and means for arranging the circuits of the system for operation by the one character of energy or the other, of means for governing the direction of rotation of the motor and means for preventing the further arrangement of the circuits of the system for operation except when the direction-governing means are inoperative.

9. In a system of control, the combination with motors that may be operated by either direct or alternating current, a change-over switch for arranging the circuits of the system for operation by the one character of energy or the other, and controlling magnet windings therefor, of means for governing the direction of rotation of the motors, and means operated thereby for preventing energizing of the controlling magnet windings except when the direction-governing means are inoperative.

10. In a system of control, the combination with motors that may be operated by either direct or alternating current, a change-over switch for arranging the circuits of the system for operation by the one character of energy or the other, and controlling magnet windings therefor, of a switch for governing the direction of rotation of the motor, and means operated thereby for preventing energizing of the controlling magnet windings except when the switches are open.

11. In a system of control, the combination with distributing conductors that are supplied, respectively, with direct and alternating currents, and current collectors to engage the respective conductors, of translating devices, switches for governing the circuits thereof, and means for preventing closing of the said switches except when the one or the other of the current collectors engages the corresponding distributing conductor.

12. In a system of control, the combination with distributing conductors that are supplied, respectively, with direct and alternating current, and current collectors to engage the respective conductors, of translating devices, means for governing the circuits thereof, and means for preventing operation of the said means except when the one or the other of the current collectors engages the corresponding distributing conductor.

13. In a system of control, the combination with distributing conductors that are supplied, respectively, with direct and alternating current, and current collectors to engage the respective conductors, of translating devices, switches for governing the circuits thereof, controlling magnet windings therefor, and means for interrupting the circuits thereof except when the one or the other of the current collectors engages the corresponding conductor.

14. In a system of control, the combination with distributing conductors that are supplied, respectively, with direct and alternating current, and current collectors to engage the respective conductors, of translating devices, switches for governing the circuits thereof, controlling magnet windings therefor, and means for interrupting the circuits thereof except when the one or the other of the current collectors engages the corresponding conductor.

15. In a system of control, the combination with distributing conductors that are supplied, respectively, with direct and alternating current, and current collectors to engage respectively therewith, of translating devices, switches for governing the circuits thereof, controlling magnet windings therefor, switches that are interposed in the circuits thereof and controlling magnet windings that are included in circuit with the respective current collectors.

16. In a system of control, the combination with sources of direct and alternating current, translating devices and means for arranging circuits of the system for operation thereof by the one character of energy or the other, of a switch that permits operation of the said means to arrange the circuits of the system only in accordance with the character of the energy supplied to the system.

In testimony whereof, I have hereunto subscribed my name this 28th day of February, 1906.

HOWARD L. BEACH.

Witnesses:
  THOS. S. HOWELL,
  BIRNEY HINES.